United States Patent Office 3,450,669
Patented June 17, 1969

3,450,669
POLYESTERS, POLYETHERS AND POLYMETHANES STABILIZED WITH BIS(HYDROXYMETHYL) PHOSPHINIC ACID AND CARBODIIMIDE
Charles D. Nolen, 521 Greenbrier Court,
New Martinsville, W. Va. 26155
No Drawing. Continuation-in-part of application Ser. No. 267,322, Mar. 22, 1963. This application Apr. 13, 1966, Ser. No. 542,220
Int. Cl. C08g 51/58, 22/13, 17/04
U.S. Cl. 260—45.9                7 Claims

ABSTRACT OF THE DISCLOSURE

Polyesters, polyethers and polyurethanes are stabilized by having incorporated therein from about 0.0001 to about 0.2% by weight of unreacted bis(hydroxymethyl) phosphinic acid and optionally, carbodiimide.

---

This application is a continuation-in-part of application Ser. No. 267,322 filed Mar. 22, 1963, now abandoned.

This invention relates to organic compounds having active hydrogen containing groups as determined by the Zerewitinoff method which are reactive with an organic polyisocyanate to prepare plastic compositions. More particularly this invention is concerned with a method of preventing undesirable effects of metal contamination of such organic compounds and/or their reaction products with organic polyisocyanates.

Polyurethane plastics are prepared by reaction between an organic compound containing active hydrogen containing groups as determined by the Zerewitinoff method and an organic polyisocyanate. Frequently it is desirable to use metallic catalysts in the preparation of either the organic compounds containing active hydrogen or for reaction thereof with an organic polyisocyanate to prepare plastics. In the course of these reactions the catalyst becomes entrained in the products. In many applications, these metal impurities cause no difficulty but often the residual metal impurity leads to undesirable effects such as side reactions at undesirable rates of reaction. The problem is particularly apparent where hydroxyl polyesters prepared by reacting a polycarboxylic acid with a polyhydric alcohol or where polyhydric polyalkylene etheres are used for reaction with an organic polyisocyanate to prepare a polyurethane plastic. When these compounds contain metallic impurities they may undergo oxidative deterioration or discloration and may yield unsatisfactory high molecular weight unusuable products. In any event it is probable that some minor amount of metals such as iron, cobalt, copper, nickel, vanadium, chromium, titanium, tin, lead and the like lead to these by-products. The sources of the metal is of little or no consequence. It may originate in the active hydrogen compound, in the polyisocyanate or in some additive such as a flame proofing agent, a foam stabilizing agent or the like.

A great many metal deactivators are available but not all of them are satisfactory for use in polyurethane grade chemicals. Indeed, not all of the metal deactivators are effective to remove or inactivate the very low amount of metals found in polyesters and polyethers used for reaction with organic polyisocyanates to prepare polyurethane plastics. Some of the most effective metal deactivators known are ethylene diamine tetraacetic acid and various salts thereof. These metal deactivators are ineffective to deactive metals to a satisfactory level from polyols suitable for making polyurethane plastics.

It is therefore an object of this invention to provide organic compounds having active hydrogen containing groups which are reactive with —NCO groups, and plastics obtained therefrom suitable for reaction with organic polyisocyanates which contain an improved metal deactivator. Another object of this invention is to provide polyhydric polyalkylene ethers which contain metal constituents which would normally cause deterioration of said polyether deactivated with a metal deactivator. Another object of this invention is to provide polyesters containing a metal deactivator. Still another object of this invention is to provide polyurethane plastics including threads foams and the like having a metal deactivator incorporated therein.

The foregoing objects and others which will become apparent from the following description are accomplished in accordance with the invention, generally speaking, by providing an organic compound which is a polyhydroxyl polyester, polyhydric polyalkylene ether or polyhydric polythioether and containing from about 0.0001 to about 0.2 percent by weight of bis(hydroxymethyl) phosphinic acid. It is preferred to have less than 0.2 percent by weight of bis(hydroxymethyl) phosphinic acid because greater amounts create an excess of acid which may accelerate the reaction.

The invention contemplates the organic compound containing bis(hydroxymethyl) phosphinic acid whether or not it contains any undesirable metal constitutent. The metal constituent which is to be deactivated by the bis-(hydroxymethyl) phosphinic acid may be derived from any source including the active hydrogen component, the polyisocyanate, another additive, or for that matter from the vessel in which the active hydrogen containing component and the organic polyisocyanate react. The purpose of including the bis(hydroxymethyl) phosphinic acid in the active hydrogen containing component is to regulate the reaction thereof with an organic polyisocyanate. In other words, the bis(hydroxymethyl) phosphinic acid should not be mixed with an organic polyisocyanate in the absence of an additional active hydrogen containing componont. It would be satisfactory, in accordance with the process of the invention, to mix the bis(hydroxymethyl) phosphinc acid with a chemically inert carrier and then simultaneously mix the polyester, polyether or polythioether, the organic polyisocyanate and the carrier containing the bis(hydroxymethyl) phosphinic acid to prepare a polyurethane plastic which was deactivated in accordance with the process of the present invention.

It must be pointed out through, the invention contemplates the polyester, polyether or polythioether mixed with bis(hydroxymethyl) phosphinic acid since they are a novel article of manufacture which may be used to prepare polyurethane plastics without fear of degradation or other undesirable side effects due to metallic contamination in the resulting product. It is safe to mix the bis-(hydroxymethyl) phosphinic acid with the polyester, polyether or polythioether which leads to the production of, for example, a polyurethane plastic, whereas it is generally not safe to mix it with some of the other components leading to the production of polyurethane plastics and particularly the organic polyisocyanate.

This invention contemplates many different kinds of plastics including those which are porous and those which are nonporous. It particularly pertains to the production of polyurethane plastics such as cellular polyurethanes which may be either rigid, semi-rigid or flexible, polyurethane coatings which are deposited on a substrate from a solvent solution and nonporous polyurethane casting, moldings, millable gums, thermoplastic pellets and the like. In the production of these polyurethane plastics, any suitable polyhydroxyl polyesters, polyhydric polyalkylene ethers or polyhydric polythioethers may be used.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethylglutaric acid, alpha-beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10 - perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example epichlorohydrin and the like as well as aralkylene oxides such as, for example, styrene oxide, and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol, sorbitol, 1,2,6-hexane triol, alpha-methyl-d-glucoside and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such, for example, the process disclosed by Wurtz in 1859 and in Encyclopedia of Chemical Technology, vol. 7, pp. 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable organic isocyanate may be used including aliphatic, cycloaliphatic alkaryl, aralkyl, heterocyclic and aryl mono- and polyisocyanates, such as, for example, ethyl isocyanate, propyl isocyanate, butyl isocyanate, pentyl isocyanate, hexyl isocyanate, heptyl isocyanate, octyl isocyanate and the like including eicosyl isocyanate. As diisocyanates, there may be used tetramethylene diisocyanate, pentamethylene diisocyanate, octamethylene diisocyanate, dodecamethylene diisocyanate, 3,3'-diisocyanato dipropyl ether, cyclohexyl isocyanate, tetrahydroalpha-naphthyl isocyanate, tetrahydro-beta-naphthyl isocyanate, xylylene diisocyanates, p,p'-diphenylmethane diisocyanate, beta, beta'-diphenylpropane 4,4'-diisocyanate and the like. Other examples are benzyl isocyanate, undecamethylene diisocyanate, p-isocyanato benzyl isocyanate, phenyl isocyanate, p-cetyloxy phenyl isocyanate, m-phenylene diisocyanate, p-phenylene diisocyanate, 1-methyl phenylene 2,4-diisocyanate, naphthylene 1,4-diisocyanate, naphthylene 1,5-diisocyanate, 2,6-toluylene diisocyanate, 1,3,5 - benzene triisocyanate, p,p',p''-triphenylmethane triisocyanate, tetrahydrofuryl isocyanate and the like. Also the addition products of polyisocyanates with a deficient quantity of a low molecular weight alcohol, such as 1,4-butane diol, glycerine, trimethylol propane, the hexanediols and hexanetriols and addition products of the aforementioned polyisocyanates with low molecular weight polyesters, such as castor oil, may also be used, as well as the reaction products of the aforementioned polyisocyanates with acetals as described in copending Ser. No. 821,360. Also suitable are the isocyanate polymers described in German patent specifications No. 1,022,789 and 1,027,394 as laid open to inspection. Mixtures of organic isocyanates may also be employed. The process according to the present invention can also be used for the foaming of the "initial adducts" obtained from the aforementioned organic compounds containing at least two active hydrogen containing groups and an excess of polyisocyanate by adding water.

The cellular polyurethane plastics are produced in accordance with the invention by the simultaneous intensive mixing of the components including the polyester, polyether or polythioether, the organic polyisocyanate with water and/or other additives. The mixing of these components is preferably effected mechanically for example in the manner described in U.S. Reissue Patent 24,514 to Hoppe et al., issued Aug. 12, 1958. It is also possible to prepare a prepolymer by reaction of the organic polyisocyanate and the organic compound containing at least two active hydrogen containing groups in a first step and then react the resulting isocyanate terminated prepolymer with water in a second step to prepare a cellular polyurethane plastic.

A wide range of different additives can be added to the reaction mixture in the production of cellular polyurethane plastics. Thus, it is sometimes convenient to use emulsifiers such as, for example, sulfonated castor oil and/or adducts of ethylene oxide with hydrophobic compounds containing one or more active hydrogen atoms, foam stabilizers such as, for example siloxane oxyalkylene block copolymers having the formula

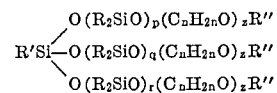

wherein R, R' and R'' are alkyl radicals having 1 to 4 carbon atoms; $p$, $q$ and $r$ each have a value of from 4 to 8 and $(SC_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer. A process which combines the catalyst and this stabilizer is contemplated by the invention as a preferred embodiment. Silicone compounds represented by the above formula and a method for making them are disclosed in U.S. Patent 2,834,748 to Bailey et al.

Accelerator compounds containing basic nitrogen in the molecule may also be used as additive compounds which will aid in the production of regular pore size in the final product such as, for example, paraffin oils and a variety of silicone oils such as, for example, dimethyl polysiloxanes and the like, in addition to dyestuffs, fillers, flame-proofing agents and plasticizers.

A tin catalyst such as stannous octoate, stannous oleate and the like may also be employed with the heretofore known basic accelerators such as, for example, tertiary amines such as, for example, dimethyl benzylamine, 1-ethoxy - 3 - dimethylamino-propane, endoethylene piperazine in small quantities, permethylated-N-ethyl-amino piperazine and dimethyl ethyl amine as well as metal compounds such as, for example, alkali metal hydroxides such as, for example, sodium hydroxide, alkali metal carbonates such as, for example, sodium carbonates, alkali metal phenolates such as, for example, sodium phenoxide and alkali metal alcoholates such as, for example, sodium methoxide.

The cellular polyurethane plastics produced in accordance with the present invention have excellent mechanical and physical properties and their bulk density can be modified in known manner by varying the quantity of polyisocyanate and water employed in their production. Cellular polyurethane plastics may be used in a variety of commercial applications including both thermal and sound insulation, cushions, upholstery units, crash pads and arm rests for automobiles and the like. Nonporous polyurethane plastics have good abrasion and tear resistance and can be used in the production of gears, gaskets, driving members, accumulation bladders, automobile tires and a whole host of other applications.

The polyurethane coatings are prepared by depositing the polyurethane on a substrate from an inert organic solvent, such as ethyl acetate, the diethyl ether of diethylene glycol, the dibuty ether of diethylene glycol, benzene, toluene, xylene, acetone, butyl acetate, methylene chloride, trichloroethylene and the like.

The nonporous polyurethanes including casting, thermoplastics, and millable gums may be prepared by the methods disclosed in U.S. Patents 2,729,618, 3,016,364; 2,620,516 and 2,621,166 among others. Generally speaking, the nonporous polyurethanes are prepared from prepolymers having free —NCO groups or free —OH groups which are in turn chain-extended with chain-extending agents. The —NCO terminated prepolymers are reacted with active hydrogen containing compounds which preferably have a molecular weight below about 500 such as, polyhydric alcohols, polyamines, amino alcohols and the like. Any suitable polyhydric alcohol may be used as the chain-extending agent such as, for example, ethylene glycol, diethylene glycol, 1,2-propylene glycol, 1,3-butane diol, 1,4-butane diol, 2,3-butane diol, a phenylene di(beta-hydroxy ethyl ether) such as para-phenylene-di-(beta hydroxy ethyl ether), 1,4-butene diol, diethanol amine and the like. Examples of amino alcohols are ethanol amine, propanol amine and others having only one —OH group and one primary amino group. Polyamines such as ethylene diamine, 1,3-propylene diamine, diamino ethanol and the like.

A highly valuable process involves the preparation of thermoplastic prepolymers having free —NCO groups by simultaneously mixing an organic polyisocyanate, a polyol such as an hydroxyl polyester having a molecular weight above about 500 and a low molecular weight polyol such as 1,4-butane diol in a single step at an —NCO:OH ratio of about 0.01 to about 1.2 and then interrupting the reaction while the product is still thermoplastic. These products are suitable for making elastic threads and the like.

The invention, in a preferred embodiment, involves the preparation of polyols which are especially adapted for the preparation of castings which require a long gel time. Often, polyurethane castings are required to have a very slow gel time so that they can be prepared by small batch techniques. A typical example of the need for this technique is the preparation of printing rollers, where a polyester is reacted with an organic polyisocyanate, for example, by the process of U.S. Patent 3,002,866. The printing rollers of the invention are prepared by reacting an hydroxyl polyester preferably prepared from a mixture of a dihydric alcohol and a trihydric alcohol with a dicarboxylic acid, which is then reacted with an organic diisocyanate. A preferred polyester is one having an hydroxyl number of about 55 and an acid number less tan 5, which is prepared from about 1 mol of adipic acid, about 1.1 to 2.5 mols of diethylene glycol and about 0.085 mols of trimethylol propane. The polyester and the organic diisocyanate are preferably reacted at an —NCO:OH ratio of from about 0.9 to about 1. Moreover, the reaction is preferably carried out by first mixing the hydroxyl polyester with the bis(hydroxymethyl) phosphinic acid and, most preferably, with both a bis(hydroxymethyl) phosphinic acid and a carbodiimide and then reacting the resulting mixture with an organic polyisocyanate. The bis-(hydroxymethyl) phosphinic acid is preferably employed in an amount within the range of from about .001 to about 0.17 percent by weight and the carbodiimide is preferably present in an amount of from about 0.01 to about 5 percent by weight. Since the polyols are often prepared in the presence of metal catalyst, which not only catalyze the reaction between —COOH and —OH, but also catalyze the reaction between —OH and —NCO; it is advantageous to include the bis(hydroxymethyl) phosphinic acid in the polyester, or other polyol, before reaction with the organic polyisocyanate. This reduces the effect of the catalysts on the —NCO:OH reaction.

A unique feature of the invention involves the combination of a polyester, a carbodiimide and the bis(hydroxymethyl) phosphinic acid. Carbodiimides are used in polyester-polyurethanes to improve their resistance to hydrolysis. The speed of the polyester-isocyanate reaction is slowed down by making the system acid. Such acids, as tartaric acid have been used; but the acid-metal complex disassociates in the presence of the carbodiimide and renders tartaric acid ineffective in controlling the rate of the reaction. A system containing a polyol, such as a polyester based on adipic acid, diethylene glycol and trimethylol propane and having a molecular weight of about 3,000 and an hydroxyl number of about 56, a carbodiimide, such as 2,6,2',6'-tetraisopropyldiphenyl carbodiimide, and bis(hydroxymethyl) phosphinic acid is preferred.

Specific examples of carbodiimide containing compounds include, 2,2'-dimethyl-diphenyl carbodiimide, 2,2'-diisopropyl - diphenyl carbodiimide, 2 - dodecyl - 2' - n-propyl - diphenyl carbodiimide, 2,2' - diethoxy - diphenyl carbodiimide, 2-oxydodecyl-2'-oxyethyl-diphenyl carbodiimide, 2,2'-dichloro-diphenyl carbodiimide, 2,2'-ditolyl-diphenyl carbodiimide, 2,2'-dibenzyl-diphenyl carbodiimide, 2,2'-dinitro-diphenyl carbodiimide, 2-ethyl-2'-isopropyl-diphenyl carbodiimide, 2,6,2',6'-tetraethyldiphenyl carbodiimide, 2,6,2',6'-tetrasecondary-butyl-diphenyl carbodiimide, 2,6,2',6'-tetraethyl-3,3'-dichloro-diphenyl carbodiimide, 2,6,2',6'-tetraisopropyl-3,3'-dinitro - diphenyl carbodiimide, 2-ethyl-cyclohexyl-2-isopropyl-phenyl carbodiimide, 2,4,6,2',4',6'-hexaisopropyl-diphenyl carbodiimide, 2,2'-diethyl-dicyclo-hexyl carbodiimide, 2,6,2',6'-tetraisopropyl-dicyclohexyl carbodiimide, 2,6,2',6'-tetraethyl-dicyclohexyl carbodiimide, and 2,2'-dichloro-dicyclohexyl carbodiimide, 2,2'-dicarbethoxy-diphenyl carbodiimide, 2,2'-dicyano-diphenyl carbodiimide and the like.

The invention is further illustrated but not limited by the following examples in which parts are by weight unless otherwise specified.

Example 1

About 500 parts of an hydroxyl polyester having an hydroxyl number of about 56 and a molecular weight of about 3,000 which has been prepared by reacting adipic acid with diethylene glycol and trimethylol-propane in the presence of about 0.0017 percent by weight of titanium tetrabutylate are heated to about 100° C. and mixed with about 35 parts of a mixture of 80 percent 2,4- and 20 percent 2,6-toluylene diisocyanate (TD-80) while maintaining the temperature at about 100° C. The reaction mixture gels in about 15 minutes. The gel point is the time when the mixture clings to a glass rod removed from the sample, indicating polymerization.

When 0.005 part of bis(hydroxymethyl) phosphinic acid is added to the polyester prior to mixing with TD–80, the gel time is increased from about 15 minutes to about 75 minutes.

When 0.07 percent by weight of bis(hydroxymethyl) phosphinic acid is added to the hydroxyl polyester and then reacted with TD–80 at 100° C., the gel time is increased to about 90 minutes.

When about 0.05 and about 0.17 percent by weight of bis(hydroxymethyl) phosphinic acid respectively is added to the polyester and then reacted with TD–80 at 140° C., the gel time is about 30 minutes in each experiment.

Example 2

A polyurethane prepolymer is prepared by reacting a polyhydric polyalkylene ether prepared by reacting propylene oxide with sorbitol in the presence of chromium until a product having an hydroxyl number of about 490 is attained and then reacting the resulting product with a mixture of 80 percent 2,4- and 20 percent 2,6-toluylene diisocyanate at an —NCO:OH ratio of 4.5:1. The resulting prepolymer turns green after only a short period. The same prepolymer prepared by an identical procedure but with 0.04 percent by weight of bis(hydroxymethyl) phosphinic acid first added to the polyether remains substantially water-white with substantially no green color developing.

Example 3

A polyester was prepared by reacting adipic acid with ethylene glycol in approximately equal molar proportions until the polyester had a hydroxyl number of about 56 and a molecular weight of about 2000. Two separate samples of this polyester were combined with bis(hydroxymethyl phosphinic acid in an amount of about 0.00416 percent by weight. These samples are hereinafter referred to as Sample A and Sample B. Sample A was maintained at room temperature, Sample B was heated to 210° C. for about 40 minutes in order to bring about reaction between the polyester and the bis(hydroxymethyl) phosphinic acid. A prepolymer was first prepared by reacting about 100 parts of polyester A and polyester B respectively with about 201 parts of 4,4'-diphenyl methane diisocyanate at a temperature of about 145° C. for about 25 minutes. The resulting prepolymer had a free —NCO content of about 6.4. The resulting prepolymer was mixed with about 47 parts of 1,4-butane diol by stirring vigorously for about 30 seconds. It was then poured into a mold and the time was measured when the reaction mixture of the prepolymer and the 1,4-butane diol would no longer flow freely from the container in which it was mixed, i.e. the cast time. For polyester A the cast time was 4.37 minutes. For polyester B where the bis(hydroxymethyl) phosphinic acid had been reacted with the polyester the cast time was only 2 minutes. This shows that when the bis(hydroxymethyl) phosphinic acid is reacted into the polyester, as inadvertently disclosed in the Robitschek Patent 2,931,746, that the cast time is adversely effected, since when the experiment was repeated, except that there was no bis(hydroxymethyl) phosphinic acid included, the cast time was 2 minutes and 30 seconds (control). It was also evident from the following physical properties that the use of bis(hydroxymethyl) phosphinic acid which has not been caused to react with the polyester results in improved properties in the elastomers.

|  | Polyester A | Polyester B | Control |
|---|---|---|---|
| Elongation, percent | 610 | 460 | 590 |
| Elongation set, percent | 15 | 10 | 9 |
| Tensile, p.s.i | 7,660 | 5,540 | 8,500 |
| Modulus, p.s.i.: |  |  |  |
| 100% | 650 | 460 | 650 |
| 200% | 1,050 | 830 | 960 |
| 300% | 1,780 | 1,330 | 1,580 |
| Tear strength, p.l.i | 222 | 65 | 170 |
| Hardness Shore B | 61 | 57 | 62 |

It is to be understood that the foregoing examples are given for illustration and that any other suitable polyol, isocyanate or the like could have been used provided the teachings of this disclosure are followed.

Although the invention has been described in considerable detail for purpose of illustration, it is to be understood that variations can be made by those skilled in the art without departing from the spirit of the invention and scope of the claims.

What is claimed is:
1. A polyhydroxyl polyester, polyhydric polyalkylene ether or polyhydric polythioether containing from about 0.0001 to about 0.2 percent by weight of unreacted bis(hydroxymethyl) phosphinic acid.
2. The composition of claim 1 wherein said polyhydroxy polyester is prepared by a process which comprises reacting diethylene glycol and trimethylol propane with adipic acid.
3. A polyurethane composition prepared by a process which comprises reacting the composition of claim 1 with an organic polyisocyanate.
4. The polyurethane of claim 3 which contains a carbodiimide.
5. The polyurethane of claim 3 which contains a carbodiimide in an amount of from about 0.01 to about 5 percent by weight based on the weight of a polyester which is an hydroxyl polyester prepared by a process which comprises reacting diethylene glycol and trimethylol propane with adipic acid in amounts corresponding to from 1.1 to about 2.5 mols of diethylene glycol and 0.0085 mol of trimethylol propane per mol of adipic acid.
6. A polyhydroxyl polyester containing from about 0.0001 to about 0.2 percent by weight of unreacted bis(hydroxymethyl) phosphinic acid, said polyhydroxy polyester having been prepared by a process which comprises reacting diethylene glycol and trimethylol propane with adipic acid in amounts corresponding to from about 1.1 to about 2.5 mols of diethylene glycol and 0.0085 mol of trimethylol propane per mol of adipic acid, said polyester having an hydroxyl number of about 55 and thereafter adding to and mixing with said polyester, said bis(hydroxymethyl) phosphinic acid.
7. The composition of claim 1 wherein said polyhydroxyl polyester was prepared by a process which comprises reacting ethylene glycol with adipic acid.

References Cited

UNITED STATES PATENTS

| 2,230,371 | 2/1941 | Bolton | 44—9 |
| 2,845,454 | 7/1958 | Buckler et al. | 260—500 |
| 3,193,523 | 7/1965 | Neumann et al. | 260—45.9 |
| 3,193,524 | 7/1965 | Holtschmidt et al. | 260—45.9 |
| 3,193,525 | 7/1965 | Kallert et al. | 260—45.9 |
| 3,249,562 | 5/1966 | Schoepfle et al. | 260—2.5 |
| 3,378,517 | 5/1968 | Knipp et al. | 260—45.9 |

DONALD E. CZAJA, Primary Examiner.

H. S. COCKERAM, Assistant Examiner.

U.S. Cl. X.R.

260—2.5, 45.95, 75, 77.5, 340